US010063059B2

(12) United States Patent
Hesselbæk et al.

(10) Patent No.: US 10,063,059 B2
(45) Date of Patent: Aug. 28, 2018

(54) WIND POWER PLANT WITH OPTIMAL POWER OUTPUT (75) Inventors: Bo Hesselbæk, Kolding (DK); Martin Hogdahl Zamastil, Sabro (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1342 days.

(21) Appl. No.: 13/504,613

(22) PCT Filed: Oct. 25, 2010

(86) PCT No.: PCT/DK2010/050282
§ 371 (c)(1),
(2), (4) Date: Sep. 28, 2012

(87) PCT Pub. No.: WO2011/050807
PCT Pub. Date: May 5, 2011

(65) Prior Publication Data
US 2013/0015660 A1    Jan. 17, 2013

Related U.S. Application Data (60) Provisional application No. 61/258,610, filed on Nov. 6, 2009.

(30) Foreign Application Priority Data

Oct. 27, 2009   (DK) ................................ 2009 70172

(51) Int. Cl.
H02P 9/04      (2006.01)
H02J 3/38      (2006.01)
(Continued)

(52) U.S. Cl.
CPC ............... *H02J 3/386* (2013.01); *H02J 3/16* (2013.01); *H02J 2003/001* (2013.01); *Y02E 10/763* (2013.01); *Y02E 40/34* (2013.01)

(58) Field of Classification Search
CPC ........ H02J 3/16; H02J 3/386; H02J 2003/001; Y02E 40/34; Y02E 10/763
(Continued)

(56) References Cited

U.S. PATENT DOCUMENTS

2006/0067095 A1* 3/2006 Hou et al. ..................... 363/78
2008/0252143 A1* 10/2008 Llorente Gonzalez et al. ............................ 307/47
(Continued)

FOREIGN PATENT DOCUMENTS

EP    1561946 A2    8/2005
EP    1855367 A1    11/2007
(Continued)

OTHER PUBLICATIONS

Rodriguez-Amenedo et al: "Operation and Coordinated Control of Fixed and Variable Speed Wind Farms", Renewable Energy, Pergamon Press, Nov. 29, 2007, vol. 33, No. 3, pp. 406-414, Oxford GB.
(Continued)

*Primary Examiner* — Sean Gugger
(74) *Attorney, Agent, or Firm* — Patterson + Sheridan, LLP (57) ABSTRACT

Controlling a wind power plant comprising at least one wind turbine generator for producing power to an electrical grid where the amount of said power is based on a signal response in a voltage signal in said electrical grid due to a change in power output into said electrical grid.

19 Claims, 5 Drawing Sheets

(51) Int. Cl.
*H02J 3/16* (2006.01)
*H02J 3/00* (2006.01)

(58) Field of Classification Search
USPC ..................................................... 290/44, 55
See application file for complete search history.

(56) References Cited

U.S. PATENT DOCUMENTS

2009/0096211 A1* 4/2009 Stiesdal .......................... 290/44
2011/0043186 A1* 2/2011 Bech et al. ................... 323/364

FOREIGN PATENT DOCUMENTS

WO          2006/120033 A2      11/2006
WO          2009/083448 A2       7/2009
WO     WO 2009083448 A2 *       7/2009

OTHER PUBLICATIONS

Hansen et al. "Centralised Power Control of Wind Farm with Doubly Fed Induction Generators", Renewable Energy, Pergamon Press, Jun. 1, 2006, vol. 31, No. 7, pp. 931-955, Oxford, GB.
Chaudhary et al.: "Wind Farm Grid Integration Using VSC Based HVDC Transmission—An Overview", IEEE 2008 Energy 2030 Conference, Nov. 17, 2008, pp. 1-7, IEEE, Piscataway, NJ, USA.
International Search Report and Written Opinion for application No. PCT/DK2010/050282 dated Jul. 28, 2011.

* cited by examiner

WIND POWER PLANT WITH OPTIMAL POWER OUTPUT

FIELD OF THE INVENTION

The present invention relates to a method for controlling a wind power plant comprising at least one wind turbine generator for producing power to an electrical grid. Moreover the invention relates to a wind power plant comprising at least one wind turbine generator for producing power to an electrical grid.

BACKGROUND OF THE INVENTION

A wind power plant (WPP) is an energy converting system consisting of one or more wind turbine generator(s), which converts kinetic wind energy into electrical energy for utility power grids. Specifically, wind is applied to wind turbine blades of the wind turbine to rotate a rotor. The mechanical energy of the rotating rotor in turn is converted into electrical energy by an electrical generator. The electrical energy from the wind turbine generator(s) is fed into an electrical grid at a point of common coupling (PCC).

It has been shown that a problem exists in the case where a wind power park experiences a LVRT (low voltage ride through) or other failure modes in the electrical grid. Whenever a wind power plant experiences a LVRT—due to a problem on the grid—the voltage V is reduced, in some cases down to zero for a while (the order 100 milliseconds), where after the voltage V and therefore also output power P is ramped up.

Today, when the wind power plant is controlled by voltage control, the wind power plant checks that the voltage is at the required value—e.g. 95% of the maximum voltage—and if affirmative, the wind power plant is within the normal voltage level of the grid. Even though the voltage level V is at the intended value and from the wind power plant side of view, everything is fine; the grid may not be strong enough to support the amount of electrical power. This may induce a new LVRT from which the WPP must recover. Thus, at voltage control of at wind power plant, a LVRT occurring as a fault in the grid, may result in the wind power plant induces a number of LVRT and subsequently disconnects from the grid. The normal solution to this problem is to strengthen the grid. This solution is of course expensive and time-consuming. Another consequence of this is often that the amount of installed capacity of wind power is lower than the actual potential of the wind site. In some cases the wind turbine generators are operated in reduced power mode, as described in EP 1222389.

Electrical grid operators want to run a stable grid, meaning they don't want to come near the stability margins of the grid.

EP 1222389 relates to a method for operating a wind farm that consists of at least two wind turbines, the power provided by these wind energy turbines being limited in amount to a maximum possible input to the network which is less than the maximum possible value of power to be provided (nominal power). The maximum possible value to be input is determined by the receiving capacity (power capacity) of the network into which the energy is input and/or by the power capacity of the energy transmission unit or the transformer by which means the energy generated by the wind turbine is input into the network.

In order to increase the amount of wind power fed into the electrical grid, measurements of the actual short circuit impedance of the grid can be made and voltage control is done in respect to the gain value of electrical grid.

This is the content of patent application WO 2009/083448 that relates to a method for controlling a voltage level of a power supply grid operationally connected to a source of electrical power, the method comprising the steps of determining a short circuit impedance of the power supply grid at a point of common coupling, calculating, using the determined short circuit impedance, a gain value of the power supply grid, and controlling the grid voltage level in accordance with the calculated gain value by applying said gain value as a gain parameter in a voltage controller.

Both documents help to solve the problem of operating the grid in a stable mode, but it might not be a solution that allows the largest penetration of electrical power into the grid and it might not be the fastest way to overcome an LVRT event.

It is thus an object of the invention to provide an improved method of maintaining stable grid, while the recovery after the LVRT is done in a fast way, and while being able to feed in as much active power as the stability of the electrical grid allows.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect, the invention relates to a method for controlling a wind power plant comprising at least one wind turbine generator for producing power to an electrical grid, where the amount of said power is based on a signal response in a voltage signal in said electrical grid due to a change in power output into said electrical grid.

An advantage of this aspect is that the present invention suggests regulating the power of the wind power plant in dependency of what power actually may be received by the grid. The method uses the knowledge that the system is nonlinear and calculates the active power that may be output to the grid.

When the Wind power plant is connected to a weak grid which may not be able to receive the output power without regulation, it is ensured that a new LVRT will not be induced by the wind power plant.

More rated power may be installed at a point of common coupling than what is possible without the invention; hence the WPP may be operated closer to the limits of the electrical grid and with less power curtailment. It may be possible to install a new Wind power plant close to an existing Wind power plant due to the method of the invention, since the dV/dt may be measured during ramp-up of power.

The invention may be carried out after a LVRT, failure of a power line or at any other time.

According to one embodiment of the invention, the wind power plant is increasing the power subsequent to a fault condition of the electrical grid, the rate of increasing the power is controlled in relation to the signal response, and the signal response is a change in grid voltage level.

An advantage of this embodiment is that the voltage level is monitored in respect to the increase of power, which will allow a faster increase in power, since the power increase is controlled in relation to the actual voltage level and not in respect to a pre-calculated model of the electrical grid.

Another advantage of this embodiment is that the actual measurement of the impedance is not needed. Instead the change in voltage level as a function of increased power (dV/dP or dV/dQ) is monitored.

According to one embodiment of the invention, the increase in power is stopped when the change in grid voltage level is zero or negative.

An advantage of this embodiment is that the invention proposes to measure the change in voltage as a function of the change in power of the entire WPP. When the dV/dP reaches a predefined value, the ramping up of the active effect is halted, and the active power remains unchanged. This will ensure that no more active power is outputted to the electrical grid than it is capable of.

According to one embodiment of the invention, the increase in power is controlled in relation to the second derivative of the grid voltage.

An advantage of this embodiment is that the controller of the grid gets an earlier indicator, then the first derivative, that the maximum level of allowed active power is about to be reached. This pre-warning can be used to start up reactive power compensation equipment or alike.

According to one embodiment of the invention, it further comprises an impedance measurement of the electrical grid and wherein a maximum active power value, of said power is based on the impedance measurement.

An advantage of this embodiment is that the measurement the impedance of the electrical grid at the wind power plant gives knowledge of the impedance of the grid and the actual amount of active power installed. The impedance can be measured as the change in grid voltage level at PCC 21 (dV) as a function of the change in outputted active power (dP) or reactive power (dQ). The measurement of impedance is to calculate the maximal possible power production (point of voltage collapse).

According to one embodiment of the invention, the maximum active power value is based on a threshold value of a short circuit ratio.

An advantage of this embodiment is that the knowledge of the impedance of the grid and the actual amount of active power installed can be used to derive the Short Circuit Ratio, which is the ratio between the short circuit power and active power installed. A threshold value of the short circuit ratio is used. In one embodiment the threshold value can be in the range of 2-10, preferable 3-5.

According to one embodiment of the invention, further comprises increasing output of reactive power in order to allow an additional increase an output of active power.

An advantage of this embodiment is that injection of reactive power into the electrical grid will support the grid, thus the amount of active power can be increased, while the stability of the grid is maintained.

According to a second aspect, the present invention is realised by a wind power plant comprising at least one wind turbine generator for producing power to an electrical grid wherein the amount of said power is based on a signal response in a voltage signal in said electrical grid due to a change in power output into said electrical grid.

According to a third aspect, the present invention is realised by a wind power plant comprising at least one wind turbine generator for producing power to an electrical grid wherein the previous mentioned embodiment of the first aspect is implemented.

The advantages of the second and third aspect are equivalent to the advantages for the first aspect of the present invention.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

FIG. 1 shows an example of the voltage profile wind power plants have to ride through.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

When operating an electrical power grid it is important to maintain a stable grid. A stable grid is an electrical grid, which is robust in respect to changes in the grid, the changes could be, but not limited to, sudden change in the phase angle, load shedding, increase in power production or worse short circuits. As a measure of the stability of the grid, the short circuit ratio (SCR) is often used, the higher SCR means higher stability level of the grid.

Often wind power plants are located remote from the users of the electrical power, therefore long transmissions lines are required. Long transmission lines usually result in a low SCR. Nevertheless it is important to be able to deliver and transmit as much power as possible on the given electrical grid without jeopardizing the stability. Normally a SCR lower than three is not allowed by the grid operator, this can be used as guidance for the minimum SCR. The standard solution to the problem of a low SCR would be to strengthen the grid. This solution is expensive and time-consuming.

Whenever a wind power plant experiences a LVRT—due to a problem in the grid—the grid voltage will drop to a much lower value. Depending on the actual distance to the fault and the configuration of electrical network between the fault and the wind power plant, the voltage level might drop as low as down the zero, which will be the case if the fault occurred right next to the PCC 21 or next to the wind turbine generator. The profile of the voltage level will of course depend on the actual fault; the requirement to what kind of voltage profile the wind power plant should be able to ride through varies for different geographical areas, and the local grid code. An example of such a profile is shown in FIG. 1.

Figure 1:
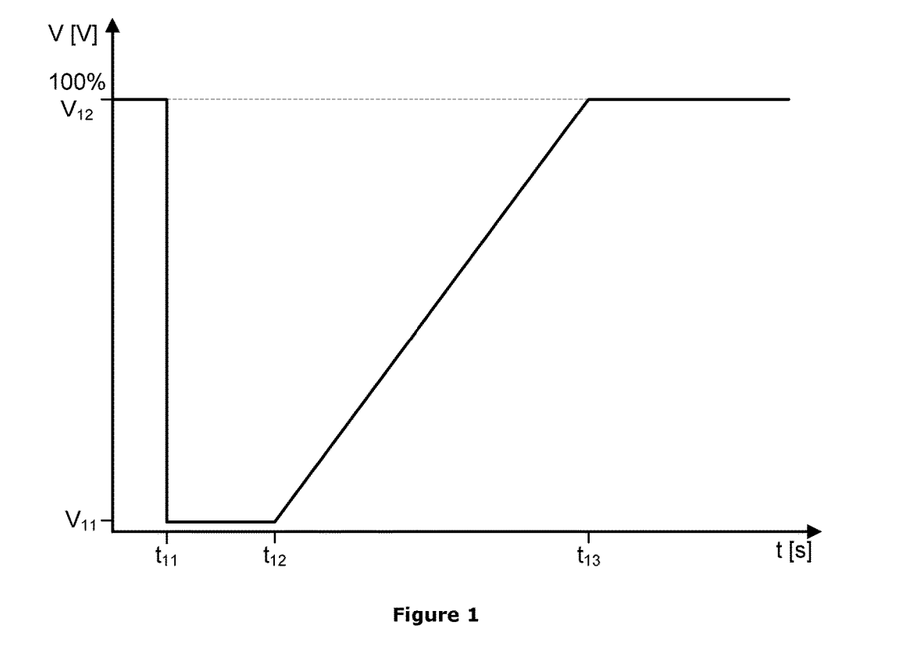

FIG. 1 shows an example of the voltage profile the wind turbine generator has ride through during a low voltage event. The profile is meant as an envelope curve, meaning that if the voltage level drops below the curve, the wind turbine generator may disconnect from the grid. The curve in FIG. 1 starts at $V_{12}$ at $t_{11}$ the voltage drops down to $V_{11}$ there it stays until $t_{12}$, and then voltage is ramped up again to $V_{12}$, which is concluded at $t_{13}$. Often the voltage level $V_{11}$ may go as far down as to zero for a while ($t_{11}$-$t_{12}$ is in the order of 100 milliseconds), where after the voltage level is ramped up, as the production units reconnect to the grid and start to feed in power. Alternatively the fault is more severe and may not be cleared that fast. If the return of the power production is too fast and if the amount of active power is higher, than the capacity of the grid, a new voltage collapse could be the result.

Figure 2:
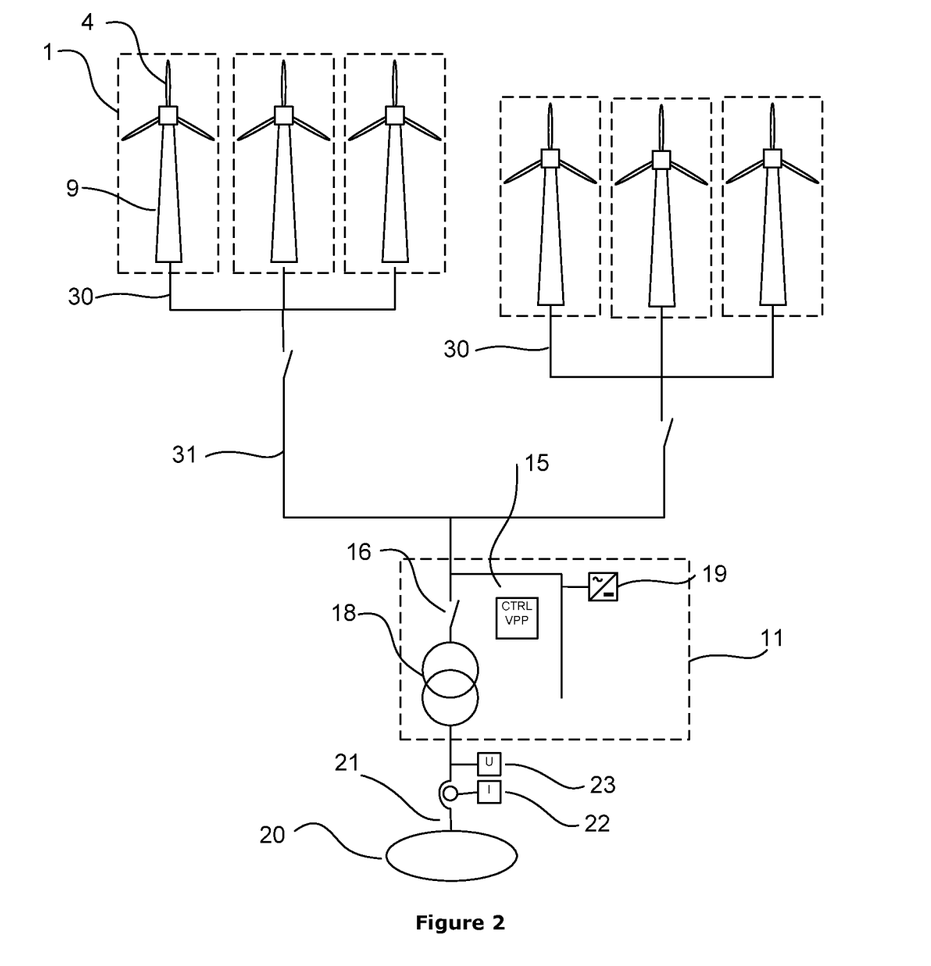
FIG. 2 shows a fast voltage recovery after a LVRT event followed by some oscillations that terminate with yet a new LVRT.

FIG. 2 shows a general layout of the electrical power system of a wind power plant. The wind power plant consists of a number turbine generator 1 distributed over a suitable geographical area. Each turbine is connected to a point of common coupling 21 in the electrical grid 20 via electrical power cables 30. Depending on the number of turbines 1 the cabling may vary. Often the wind power plant also has a substation 11 that is also connected to the point of common coupling 21.

The substation 11 can either be a physical area of the wind power plant or an aggregated number of features spread over the wind power plant. Here the substation 11 is presented as being located at one physical area. The main components of the substation are the main transformer 18 and the main switch gear 16, together with a wind power plant controller 15. Additionally some reactive power compensation equipment 19 is also located at the substation 11 or it can be distributed in each wind turbine generator 1. The reactive power compensation equipment may comprise candidates from the following, but is not limited to the mentioned candidates: Switched capacitor banks, switched inductor banks, static condensers, synchronous condensers 19 and STATCOMs 19. The reactive power compensation is used to control, either the power factor, the level of reactive power flowing or to control voltage level of the connection point 21. All of these measures are related and familiar to the person skilled in art of electrical power generation.

The wind power plant delivers the produced electrical power to an electrical grid 20. The wind power plant can be connected to the grid through a main transformer 18 and a circuit breaker 16 or just through a circuit breaker 16. The voltage level on the grid side of the transformer is in general higher than at the turbine side of the transformer. The actual voltage level of grid side depends on the actual location, but also on the size of the wind power plant. Smaller wind power plants are often connected to the grid 20 at distribution level whereas larger wind power plants can be connected directly to the transmission grid 20.

Some wind power plants has defined the Point of Common Coupling (PCC) 21 at grid side of the main transformer, and some other plants has the PCC 21 defined at the wind turbine generator side of the transformer 18. The impedance measurements is done by sensors, i.e. voltage 23 and current 22, the measurements do not necessary have to be measured at the PCC 21. By knowing the impedance of the transformer 18, the measurements can be transformed to the other side of the transformer 18 or even further to the individual wind turbine generator. Alternatively can the impedance be measured by sensors in each wind turbine generator.

The wind power plant is controlled by a wind power plant controller 15 that can dispatch various reference set points to the individual wind turbine generator 1 in wind power plant. The wind power plant controller 15 also receives numerous numbers of measurements from the individual wind turbine generator 1. The control of the compensation equipment may be based on measurements of voltages 23 and currents 22 at some points, normally the PCC 21, from that the active power and reactive power can be extracted.

Figure 3:
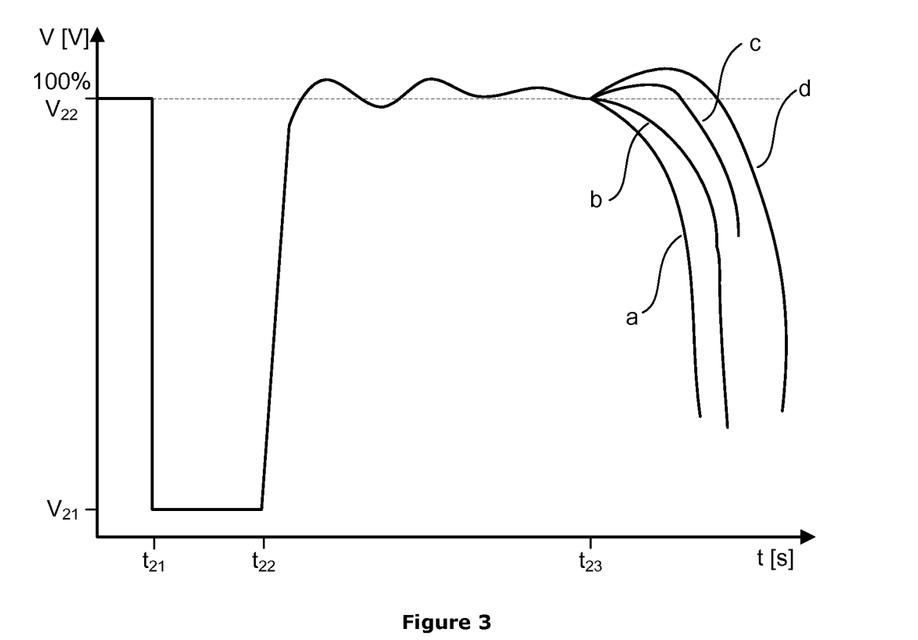
FIG. 3 shows a controlled voltage recovery according to the present invention.

The objection of present invention is among other things to prevent reoccurrence of low voltage events. FIG. 3 shows examples of an LVRT event followed by a new voltage collapse a, b, c and d. The LVRT start with a step voltage dip at time $t_{21}$ and a recovery starting at $t_{22}$, this similar to what is covered in FIG. 1. The voltage has returned to $V_{22}$, which is at nominal level around 100%. At time $t_{23}$ the grid voltage starts to drop again, the reason for this can be a too high amount of active power outputted into the electrical grid 20. Depending on the grid impedance the voltage collapse may follow different trajectories, shown as a, b, c and d.

Figure 4:
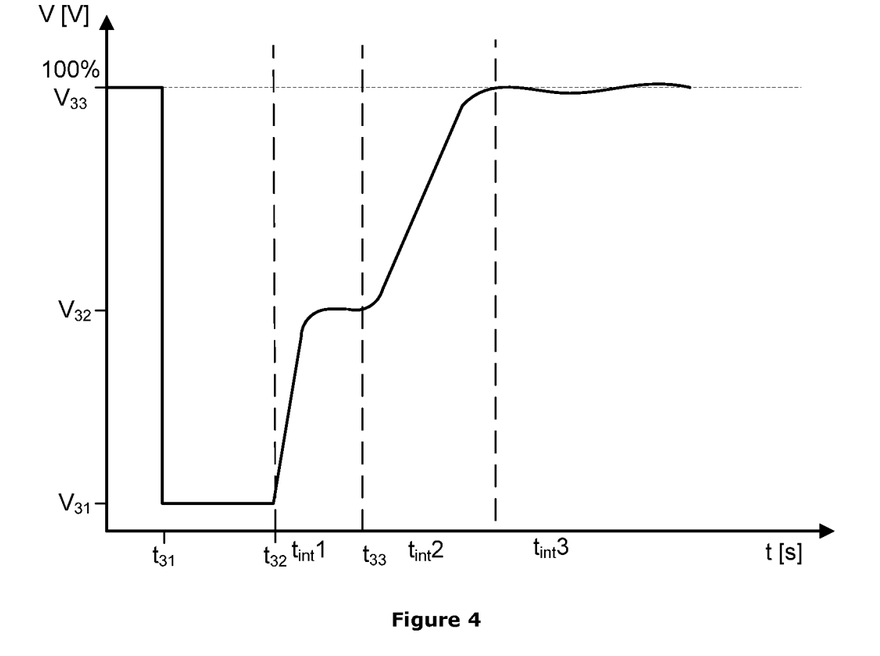
FIG. 4 shows the flow of the invention.

FIG. 4 shows an embodiment of the invention where recovery of an LVRT event starts with a fast open loop voltage ramp up, in the time interval $t_{int}1$ between $t_{32}$ and $t_{33}$, to about 50% of rated voltage level $V_{32}$. The interval $t_{int}1$ could be in the range of 50-200 ms, preferably about 100 ms. The flat part of the curve shows that after the open loop section, a short transition period may happen. The impedance measurements are taken at the voltage $V_{32}$. It is followed by, $t_{int}2$, a controlled ramp up to 100% (about 300-400 ms). To ensure stability following a low voltage ride through, the impedance can be measured, when the voltage level has resumed to 50% of nominal level. The voltage level of 50%, is just an example, other values in the range of 25% to 75% would give a similar performance. Based on the impedance measurement the maximum allowed active power output is calculated. After that interval $t_{int}3$ takes over when the voltage has reached $V_{33}$, which is the stable voltage level. The stable voltage level in FIG. 4 is 100%, but it may be what ever values a grid system operator dictates to the wind power plant controller 15. During the interval $t_{int}3$ some minor voltage variation may occur. The voltage ramp up at the controlled phase, $t_{int}2$ could be around 1 pu/s.

An embodiment of the present invention proposes to measure the impedance of the electrical grid 20 at the point of common coupling (PCC) 21 for the wind power plant or at the terminal of each wind turbine generator. The impedance can be measured as the change in grid voltage level at PCC 21 (dV) as a function of the change in outputted active power (dP) or reactive power (dQ) of the entire WPP. Based on the knowledge of the impedance of the grid 20 and the actual amount of active power installed, the SCR can be derived, as the ratio between the short circuit power and active power installed. A threshold value of the short circuit ratio is used. In one embodiment the threshold value can be in the range of 2-10, preferable 3-5. The actual impedance measurement can be at the wind turbine generator terminal or at the point of common coupling. If the measurement is made at wind turbine generator level, the system needs information on how many wind turbine generators are online to calculate the impedance at PCC 21. The calculation of the impedance at PCC 21 can be made by a power plant controller (PPC) 15 and then dispatched to each turbine. Alternatively the PPC 15 can dispatch the number of connected wind turbine generators, then the calculation of the PCC 21 impedance is made by the individual wind turbine generator.

In a second embodiment of the invention the actual measurement of the impedance is not needed. Instead the change in voltage level as a function of increased power (dV/dP or dV/dQ) is monitored. When the dV/dP reaches a predefined value, the ramping up of the active power P is halted, and the amount of active power remains unchanged. It would of course be the same if the ramp up of active power was constant and the change in voltage (dV/dt) was monitored.

In an implementation of the second embodiment the predefined value of dV/dP is when dV/dP is equal to zero. In another implementation is a negative value of the second derivative of the voltage level, $dV/dt^2$, used as an indicator for how much more power that can be injected in the grid 20. Any of the differentiated values of the voltage level, can be used as input for controlling the ramp up rate. If the second embodiment was applied to FIG. 3, the second voltage drop at $t_{23}$ could have been avoided. An example could be trajectory d, which has a local maximum after $t_{23}$ at the maximum the dV/dt is equal to zero, indicating that no further increase in active power should be outputted.

In the second embodiment of the present invention the amount of outputted active power is controlled in respect of the voltage gradient dV/dP.

The allowed value of active power might not be the rated active power value of the wind power plant under normal operation. Thus some power curtailment is made, in order to avoid new LVRT situations by feeding in more power than the grid 20 can carry after the LVRT. Here it also applies that injection of reactive power into the electrical grid 20 will increase the allowed amount of active power in the electrical grid 20.

One implementation of the embodiment of the invention can be put into operation during and following a low voltage ride through (LVRT) or other failure modes in an electrical grid 20. Another implementation of the invention may be carried out at any other time during operation of the wind power plant in order to maximize the output power in respect to the grid condition, in order to utilize the capacity of the grid 20.

An example of how an implementation of the invention can be used, could be a wind power plant with at least one wind turbine generator 1. The wind power plant is connected to an electrical grid 20 through a PCC 21. The electrical grid 20 of interest consists of two equal transmission lines. If one of the transmission lines fails, the grid impedance seen from the PCC 21 will raise to about twice the value as it was prior to the fault. This also means that the short circuit ratio is half the value, and therefore is the capacity of the electrical grid 20 reduced. The PPC 15 will, based on the method of the invention, calculate the maximum allow power output from the wind power plant to the electrical grid with the new reduced capacity.

Figure 5:
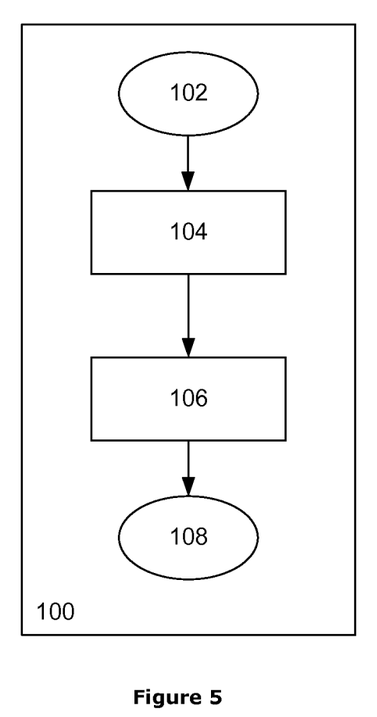
FIG. 5 shows an example of a layout of a wind power plant according to the invention.

FIG. 5 shows the different steps in the method 100 of the invention. The method 100 starts with step 102. During step 104 the amount of power output is changed. As a reaction to step 104 a signal response happens, which is monitored in step 106. The steps 104 and 106 may be repeated as often as appropriate. The method 100 ends at step 108.

The invention uses the knowledge that the system is nonlinear and adjusts the amount of active power that may be output. As an additional control parameter the method can also allow injection of reactive power into the grid 20 in order to raise the voltage level, which is well known in the field of power engineering.

It should be noted that the actual SCR at PCC 21 may change during the LVRT event, which will add even more benefit to this invention, since the outputted power may not only depend on the actual value of SCR or a static value of SCR, but also on the dV/dP response.

The inventions mentioned in the embodiment may be carried out at the individual wind turbine generators or at wind power plant level. The wind turbine generators are able to carry out the method; a PPC 15 may monitor and request more reactive power from a STATCOM or from the individual wind turbine generators.

The PPC 15 is arranged to let the individual wind turbine generators in the WPP know how many wind turbine generators are online/outputting power so that the individual wind turbine generators may estimate the impedance and thus calculate the SCR.

Moreover, it is conceivable that two wind power plant or wind turbine generators connected to the same PCC 21 are performing the method of the invention simultaneously. In this situation, dV/dP or dV/dQ as measured by the individual WPPs is larger than if only one WPP was outputting power to the grid 20 therefore the individual WPP will stop outputting P earlier, compared to the situation where only one WPP is performing the invention. Thus, in this situation the method provides a conservative operation, hence it may be possible to install a WPP close to an existing WPP due to the method of the invention.

In summary the invention relates to,

Controlling a wind power plant comprising at least one wind turbine generator for producing power to an electrical grid 20 where the amount of said power is based on a signal response in a voltage signal in said electrical grid 20 due to a change in power output into said electrical grid 20.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for controlling a wind power plant, comprising at least one wind turbine generator, for producing power to an electrical grid, the method comprising:
    changing a first amount of power delivered from the wind power plant to the electrical grid;
    receiving, in response to the changed first amount of delivered power, a signal response in a voltage signal of the electrical grid; and
    determining, based on the received signal response, a second amount of power to deliver to the electrical grid.

2. The method of claim 1, wherein changing the first amount of power delivered comprises increasing the power in response to a fault condition of the electrical grid, wherein a rate of increasing the power is controlled in relation to the received signal response, and wherein the signal response is a change in grid voltage level.

3. The method of claim 2, wherein the increase in power is stopped when a rate of the change in grid voltage level is zero or negative.

4. The method of claim 2, wherein the increase in power is controlled in relation to a second derivative of the grid voltage.

5. The method of claim 1, further comprising:
measuring an impedance of the electrical grid, wherein a maximum active power value of the second amount of power is determined based on the measured impedance.

6. The method of claim 5, wherein the maximum active power value is determined based on a threshold value of a short circuit ratio.

7. The method of claim 1, further comprising:
increasing an output of reactive power in order to allow an additional increase in output of active power.

8. A wind power plant, comprising:
at least one wind turbine generator for producing power to an electrical grid, wherein an amount of power to be delivered to the electrical grid is determined based on a signal response in a voltage signal of the electrical grid, the signal response caused by a change in power delivered from the wind power plant into the electrical grid.

9. The wind power plant of claim 8, further comprising:
a controller arranged to increase the power in response to a fault condition of the electrical grid, wherein a rate of increasing the power is controlled in relation to the signal response, and wherein the signal response is a change in grid voltage level.

10. The wind power plant of claim 9, wherein the increase in power is stopped when a rate of the change in grid voltage level is zero or negative.

11. The wind power plant of claim 9, wherein the increase in power is controlled in relation to a second derivative of the grid voltage.

12. The wind power plant of claim 8, further comprising sensors for measuring an impedance of the electrical grid, wherein a maximum active power value of said power is based on the measured impedance.

13. The wind power plant of claim 12, wherein the maximum active power value is based on a threshold value of a short circuit ratio.

14. The wind power plant of claim 8, further comprising:
increasing an output of reactive power in order to allow an additional increase in output of active power.

15. A wind power plant comprising:
at least one wind turbine generator for producing power to an electrical grid; and
a controller for controlling power production of the wind power plant, wherein the controller operates to:
change a first amount of power delivered from the wind power plant to the electrical grid;
receive, in response to the changed first amount of delivered power, a signal response in a voltage signal of the electrical grid; and
determine, based on the received signal response, a second amount of power to deliver to the electrical grid.

16. The method of claim 3, wherein the rate of the change in grid voltage is respective to a change in time.

17. The method of claim 3, wherein the rate of the change in grid voltage is respective to a change in active power output.

18. The wind power plant of claim 10, wherein the rate of the change in grid voltage is respective to a change in time.

19. The wind power plant of claim 10, wherein the rate of the change in grid voltage is respective to a change in active power output.

* * * * *